US008792349B2

(12) United States Patent  (10) Patent No.: US 8,792,349 B2
Sarkar  (45) Date of Patent: Jul. 29, 2014

(54) CONCURRENT ASSOCIATION OF A WIRELESS MOBILE NODE WITH ACCESS POINTS FOR INCREASING CAPACITY OF ACCESS POINTS

(75) Inventor: Dilip Sarkar, Pinecrest, FL (US)

(73) Assignee: University of Miami, Miami, FL (US)

( * ) Notice: Subject to any disclaimer, the term of this patent is extended or adjusted under 35 U.S.C. 154(b) by 496 days.

(21) Appl. No.: 13/060,826

(22) PCT Filed: Aug. 26, 2009

(86) PCT No.: PCT/US2009/055057
§ 371 (c)(1),
(2), (4) Date: Feb. 25, 2011

(87) PCT Pub. No.: WO2010/027858
PCT Pub. Date: Mar. 11, 2010

(65) Prior Publication Data
US 2011/0149739 A1    Jun. 23, 2011

Related U.S. Application Data

(60) Provisional application No. 61/091,946, filed on Aug. 26, 2008.

(51) Int. Cl.
*H04W 28/08*    (2009.01)
(52) U.S. Cl.
USPC ........... 370/235; 370/331; 370/334; 370/348; 455/434; 455/436
(58) Field of Classification Search
USPC ......... 370/328, 338, 331, 394, 468, 318, 235, 370/348; 455/434, 435.2, 436–437
See application file for complete search history.

(56) References Cited

U.S. PATENT DOCUMENTS

| | | | |
|---|---|---|---|
| 6,321,093 B1 * | 11/2001 | Dalal | 455/512 |
| 7,480,264 B1 * | 1/2009 | Duo et al. | 370/310.2 |
| 2004/0037286 A1 * | 2/2004 | Huang et al. | 370/394 |
| 2006/0064497 A1 * | 3/2006 | Bejerano et al. | 709/228 |
| 2006/0182023 A1 | 8/2006 | Bejerano et al. | |
| 2007/0248033 A1 * | 10/2007 | Bejerano et al. | 370/318 |
| 2008/0025342 A1 * | 1/2008 | Kim et al. | 370/468 |
| 2011/0188470 A1 * | 8/2011 | Lu et al. | 370/331 |

FOREIGN PATENT DOCUMENTS

KR   10-2007-0050698   5/2007

OTHER PUBLICATIONS

International Search Report and Written Opinion issued in PCT/US2009/055057, filed Aug. 26, 2009.
Sarkar et al., "Architecture, Implementation, and Evaluation of cmpTCP Westwood" IEEE GLOBECOM 2006 proceedings, pp. 1-5, Nov. 2006.
A prototype implementation of SCTP. http://www.sctp.de, 2003.
IEEE 802.11 WG. Part 11: Wireless LAN Medium Access Control (MAC) and Physical Layer (PHY) Specification, 1999.
IEEE 802.11a WG. Part 11: Wireless LAN Medium Access Control (MAC) and Physical Layer (PHY) Specification: High-Speed Physical Layer in the 5 GHz Band, 1999.
IEEE 802.11b WG. Part 11: Wireless LAN Medium Access Control (MAC) and Physical Layer (PHY) Specification: High-Speed Physical Layer Extension in the 2.4 GHz Band, 1999.

(Continued)

*Primary Examiner* — Charles C Jiang
*Assistant Examiner* — Mohamed Kamara
(74) *Attorney, Agent, or Firm* — Malloy & Malloy, P.L.

(57) ABSTRACT

Access for wireless mobile nodes (WMNs) to access points (APs) may be provided via a wireless network where each WMN is associated with a plurality of APs, according to an exemplary embodiment.

16 Claims, 5 Drawing Sheets

(56) References Cited

OTHER PUBLICATIONS

IEEE 802.11g WG. Part 11: Wireless LAN Medium Access Control (MAC) and Physical Layer (PHY) Specification: High-Speed Physical Layer Extension in the 2.4 GHz Band, 1999.

LAN MAN Standards Committee. IEEE Standard for Local and metropolitan area networks—Part 21: Media Independent Handover Services, IEEE Std 802.21, 2008.

LAN MAN Standards Committee of the IEEE Computer Society. IEEE P802.2/D8.0: Draft Standard for Local and Metropolitan Area Networks: Media Independent Handover Services, 2007.

Abd El Al, A., T. Saadawi, and M. Lee. LS-SCTP: A bandwidth aggregation technique for stream control transmission protocol. Computer Communications, 27(10), 2004.

Argyriou, A. and V. Madisetti. Bandwidth aggregation with SCTP. In IEEE Globecom, San Francisco, CA. Dec. 2003.

Barbir, A., B. Cain, R. Nair, and O. Spatscheck. Known Content Network (CN) Request-Routing Mechanisms. RFC3568, IEFT, Jul. 2003.

Bejerano, Y., S-J. Han, and L. Li. Fairness and load balancing in wireless LANs using association control. IEEE/ACM Transactions on Networking, 15(3), 2007.

Bellovin, S., J. Ioannidis, A. Kerornytis, and R. Stewart. On the use of Stream Control Transmission Protocol (SCTP) . . . RFC3554, http://www.sctp.de/sctp.html. Jul. 2003.

Caro, A., P. Amer, J. Iyengar, and R. Stewart. Retransmission policies with transport layer multihoming. In ICON, Sydney, Australia, Sep. 2003.

Carson, M. and D. Santay. NIST Net—A Linux-based network emulation tool. ACM SIGCOMM Computer Communication Review, 33(3):111-126, 2003.

Casetti, C. and M. Meo. A new approach to model the stationary behavior of TCP connections. Italian Ministry for University and Scientific Research, Torino, Italy, 2000.

Coene, L. Stream control transmission protocol applicability statement. RFC3257, http://www.sctp.de/sctp.html. Apr. 2002.

Day, M., G. Tomlinson, B. Cain, and P. Rzewski. A model for content internetworking (CDI). RFC3466, IETF, Feb. 2003.

Fu, S. and M. Atiquzzaman. Performance modeling of SCTP multihoming. In IEEE Globecom, 2005.

Fujiwara, A., Y. Sagara, and M. Nakamura. Access point selection algorithms for maximizing throughputs in wireless LAN environment. In IEEE CNF, 2007.

Ganesan, D., R. Govindan, S. Shenker, and D. Estrin. Highly-resilient, energy-efficient . . . ACMSIGMOBILE Mobile Computing and Communications Review, 5(4):11-25, Oct. 2001.

Gerla, M., S.S. Lee, and G. Pau. TCP westwood simulation studies in multiple-path cases. In SPECTS, San Diego, California, Jul. 2002.

Hacker, T., and B. Athey. The end-to-end performance effects of parallel TCP sockets on a lossy wide-area network. In IEEE IPDPS, Ft. Lauderdale, FL, Apr. 2002.

Hsieh, H.Y. and R. Sivakumar. A transport layer approach for achieving . . . In ACM International Conference on Mobile Computing and Networking (MOBICOM), Atlanta, GA, Sep. 2002.

Iyengar, J., K. Shah, P. Amer, and R. Stewart. Concurrent multipath transfer using SCTP multihoming. In SPECTS, San Jose, California, Jul. 2004.

Iyengar, J., P. Amer, and R. Stewart. Concurrent multipath transfer using transport layer multihoming: Performance under varying . . . In MILCOM, Monterey, CA, Oct. 2004.

Iyengar, J., P. Amer, and R. Stewart. Retransmission policies for concurrent multipath transfer using SCTP multihoming. In ICON, Singapore, Nov. 2004.

Iyengar, J., P. Amer, and R. Stewart. Receive buffer blocking in concurrent multipath transfer. In Globecom, Nov. 2005.

Iyengar, J., P. Amer, and R. Stewart. Concurrent multipath transfer using SCTP multihoming over independent end-to-end . . . IEEE/ACM Transactions, Technical Report, Oct. 2006.

Jungmaier, A., E. Rescorla, and M. Tuexen. Transport layer security over stream control transmission protocol. RFC3436, http://www.sctp.de/sctp.html., Dec. 2002.

Koutsopoulos, I. and L. Tassiulas. Joint optimal access point selection and channel assignment in wireless networks. IEEE/ACM Transactions on Networking, 15(3), 2007.

Krishnan, R. and J. A. Silvester. Choice of allocation granularity in multipath source routing schemes. In IEEE INFOCOM, 1993.

Mao, S., D. Bushmitch, S. Narayanan, and S.S. Panwar. MRTP: A multiflow real-time transport protocol . . . In IEEE Vehicular Technology Conference, Orlando, FL, Oct. 2003.

Mathis, M., J. Semke, J. Mandavi, and T. Ott. The macroscopic behavior of the TCP congestion avoidance algorithm. ACM Computer Communications Review, Jul. 1997.

Ong, L. and J. Yoakum. An introduction to the stream control transmission protocol (SCTP). RFC 3286, http://www.sctp.de/sctp.html., May 2002.

Padhye, J., V. Firoiu, D. Towsley, and J. Kurose. Modeling TCP throughput: A simple model and its empirical validation. In ACM SIGCOMM, 1998.

Pastor, J. and M. Belinchon. Stream control transmission protocol (SCTP) management information base (MIB). RFC 3873, http://www.sctp.de/sctp.html., Sep. 2004.

Phatak, D.S. and T. Goff. A novel mechanism for data streaming across mulitple IP links for improving throughput and reliability . . . In IEEE INFOCOM, New York, NY, Jun. 2002.

Sarkar, D. A concurrent multipath TCP and its markov model. In ICC, Istanbul, Turkey, Jun. 2006.

Sarkar, D. and S. Paul. Architecture, implementation, and evaluation of cmpTCP Westwood. In Globecom, San Francisco, CA, Nov. 2006.

Sarkar, D. and U.T. Sarkar. Balancing load of APs by concurrent association of every wireless node with many APs. In ICNS, Miami, FL, Nov. 10, 2008.

Sauer, C.H. and K.M. Chandy. Computer systems performance modeling. 1981, pp. 76-77, Prentice-Hall, Inc., Englewood Cliffs, NJ.

Siris, V.A. and D. Evaggelatou. Access point selection for improving throughput fairness in wireless LANs. In IEEE CNF, 2007.

Sivakumar, H., S. Bailey, and R. Grossman. PSockets:The case for application-level network striping for data intensive . . . In IEEE Supercomputing (SC), Dallas, TX, Nov. 2000.

Stewart, R., Q. Xie, K. Momeault, C. Sharp, H. Schwarbauer, T. Taylor, I. Rytina, M. Kalla, L. Zhang, and V. Paxson. Stream control transmission . . . RFC2960, IETF, Oct. 2000.

Stewart, R., et al. Stream control transmission protocol. RFC2960, http://www.sctp.de/sctp.html, Oct. 2000.

Stone, J., R. Stewart, and D. Otis. Stream control transmission protocol (SCTP) checksum change. RFC3309, http://www.sctp.de/sctp.html, Sep. 2002.

Stewart, R., M. Ramalho, Q. Xie, M. Tuexen, and P. Conrad. Stream control transmission protocol (SCTP) partial reliability . . . RFC3758, http://www.sctp.de/sctp.html, May 2004.

Stewart, R. I. Arias-Rodriguez, K. Poon, A. Caro, and M. Tuexen. Stream control transmission protocol (SCTP) . . . RFC4460, http://www.sctp.de/sctp.html., Apr. 2006.

Stewart, R. Stream control transmission protocol. RFC4960, http://www.sctp.de/sctp.html., Sep. 2007.

Stewart, R., Q. Xie, M. Tuexen, S. Maruyama, and M. Kozuka. Stream control transmission protocol (SCTP) dynamic address . . . RFC5061, http://www.sctp.de/sctp.html., Sep. 2007.

Stewart, R., M. Tuexen, and G. Camarillo. Security attacks found against the stream control transmission protocol (SCTP) . . . RFC5062, http://www.sctp.de/sctp.html., Sep. 2007.

Suzuki, H. and F.A. Tobagi. Fast bandwidth reservation scheme with multilink and multipath routing in ATM networks. In IEEE INFOCOM, 1992.

Tuexen, M., R. Stewart, and P. Lei. Padding chunk and parameter for the stream control transmission protocol (SCTP). RFC4820, http://www.sctp.de/sctp.html., Mar. 2007.

Tuexen, M., R. Stewart, P. Lei, and E. Rescorla. Authenticated chunks for the stream control transmission protocol (SCTP). RFC4895, http://www.sctp.de/sctp.html., Aug. 2007.

\* cited by examiner

A SCHEMATIC DIAGRAM OF A CMPTCP ONE TRANSMISSION QUEUE FOR ALL PATHS AND ONE RETRANSMISSION QUEUE FOR EACH PATH

FIG. 1C

A SCHEMATIC DIAGRAM OF AN AP OPERATING IN THE PCF MODE. AFTER RECEIVING SERVICE FROM THE AP, THE WMN MAY STAY CONNECTED WITH THE AP OR MAY DISCONNECT.

FIG. 2

IEEE 802.21 MIH SERVICES AND SERVICE INITIATION

FIG. 3

A SCHEMATIC DIAGRAM OF WIRELESS MOBILE NODES ASSOCIATED WITH ALL APs AND RECEIVING SERVICE FCFS QUEUES OF ALL APs

FIG. 4

MARKOV STATE DIAGRAM OF AN AP SERVING WIRELESS MOBILE NODES FROM A FCFS QUEUE

FIG. 5

A SCHEMATIC DIAGRAM OF WIRELESS MOBILE NODES ASSOCIATED WITH ALL APs AND RECEIVING SERVICE FROM A COMMON FCFS QUEUE

FIG. 6

MARKOV STATE DIAGRAM OF k APs SERVING WIRELESS NODES FROM A FCFS QUEUE

FIG. 7

QUEUE LENGTH FOR DIFFERENT LOADS

FIG. 8

WAITING TIME AND QUEUE LENGTH REDUCTION FOR DIFFERENT LOADS

CONCURRENT ASSOCIATION OF A WIRELESS MOBILE NODE WITH ACCESS POINTS FOR INCREASING CAPACITY OF ACCESS POINTS

CROSS-REFERENCE OF RELATED APPLICATIONS

This application is a U.S. national stage application under 35 U.S.C. §371 of PCT/US2009/055057 filed Aug. 26, 2009, and claims the benefit of U.S. Provisional Patent Application No. 61/091,946, filed Aug. 26, 2008, entitled "CONCURRENT ASSOCIATION OF A WIRELESS NODE WITH ACCESS POINTS FOR INCREASING CAPACITY OF ACCESS POINTS" the entire contents of which are hereby incorporated by reference.

BACKGROUND OF THE INVENTION

Wireless local area network (WLAN) access networks (AN) and wireless wide area networks (WWAN) are being deployed in public places such as, e.g., but not limited to, airports, hotels, shopping malls, and coffee shops. WLAN access points (APs), commonly referred to as, e.g., "hotspots" provide low cost public access to data network services for wireless mobile nodes (WMNs). WLANs are generally used indoors using such technologies as WiFi with a minimal range intended for local area network (LAN) applications. WWAN applications are often implemented for outdoor applications as well using such technologies as WiMax.

SUMMARY OF THE INVENTION

An exemplary embodiment of the present invention may include a method, system and/or computer program product for balancing a load of access points (APs) accessed by one or more wireless mobile nodes (WMNs) as part of a wireless network access system (WNAS).

An exemplary embodiment of the invention sets forth a computer implemented method of balancing load of access points (APs) that are part of a wireless network access system (WNAS). In an exemplary embodiment, the method may include associating at least one wireless mobile node (WMN) to a plurality of APs concurrently, wherein said at least one WMN and said plurality of APs are part of the WNAS.

According to an exemplary embodiment, the method may further include: providing a concurrent multipath transmission control protocol (CMTCP) connection at a transport layer.

According to one exemplary embodiment, the method may include where one or more of the APs and/or one or more of the WMNs may be compliant with the IEEE 802.21 standard.

According to an exemplary embodiment, the method may further include: establishing and/or maintaining multiple associations with the plurality of APs, using at least one of: media independent command services (MICS); and/or media independent information services (MIIS) subsections of the IEEE 802.21 standard.

According to an exemplary embodiment, the method may further include: operating in a point coordination function (PCF) mode by the plurality of APs, including serving by a given AP all WMNs associated with said given AP from a first come first served (FCFS) queue.

According to an exemplary embodiment, the method may further include: initiating an association of a given WMN with multiple APs comprising: inserting said given WMN into a back of a first come first served (FCFS) queue of each of the APs with which said given WMN has successfully been associated.

According to an exemplary embodiment, the method may further include: placing a given WMN that is associated with the plurality of APs, into service queues of all associated APs; and providing service from all associated APs to the given WMN.

According to an exemplary embodiment, the method may further include: providing service to a WMN that is in the front of a first come first served (FCFS) queue of a given AP, as soon as said service is available.

According to an exemplary embodiment, the method may further include: not providing any service from a given AP to a given WMN, even when the WMN is in the front of the service queue of the given AP, if the given WMN that is associated with said plurality of APs but has no message or packet to transmit; placing the given WMN in the back of the FCFS queue; and/or serving the next WMN in the FCFS queue of the AP.

According to an exemplary embodiment, the method may further include: not providing any service from an AP to a given WMN that is currently getting service from an other associated AP; not providing any service from any other AP to the WMN, when it is currently getting service from the other associated AP, even if the WMN moves to the front of the FCFS queue of the other associated AP; and/or placing the WMN in the back of the FCFS queue of the other associated AP.

According to an exemplary embodiment, the method may further include: removing from each and every FCFS queue with which a given WMN was associated, where the given WMN is disassociating from an associated WNAS.

According to an exemplary embodiment, the method may further include: a) providing a common transmission queue (TxQ) for internet protocol (IP) packets to be dispatched to all destinations; b) providing a retransmission queue (RTxQ) for each destination for IP packets dispatched but awaiting acknowledgment; c) distributing IP packets via a scheduler from the TxQ to destinations for dispatching; and/or d) removing a given IP packet from the RTxQ upon receiving an acknowledgment of receipt of the given IP packet dispatched from the RTxQ from the recipient.

According to another exemplary embodiment, the method may include: providing one transmission queue (TxQ) and one retransmission queue (RTxQ) for all destinations/paths.

According to one exemplary embodiment, the method may include: providing one transmission queue (TxQ) and one retransmission queue (RTxQ) for each destination/path.

According to an exemplary embodiment, the method may further include: providing one transmission queue (TxQ) for all destinations/paths and one retransmission queue (RTxQ) for each destination/path.

According to yet another exemplary embodiment of the invention, a system for balancing load of access points (APs) that are part of a wireless network access system (WNAS) may be set forth. In an exemplary embodiment, the system may include: a plurality of the APs wirelessly coupled via the WNAS; at least one wireless mobile node (WMN) associated concurrently to the plurality of APs.

According to another exemplary embodiment, a system of balancing load in a wireless network access system (WNAS) is set forth. According to an exemplary embodiment, the system may include: a plurality of access point (AP) means for accessing the WNAS; at least one wireless mobile node (WMN) means for providing access to a user, said WMN means coupled to the WNAS; and means for associating the at least one wireless mobile node (WMN) means to said plurality of AP means concurrently.

According to yet one more exemplary embodiment, a computer program product embodied on a computer accessible medium may be set forth. According to an exemplary embodiment of the invention, the computer program product may include program logic which when executed on a processor may perform a method of balancing load of access points (APs) that are may be part of a wireless network access system (WNAS). According to an exemplary embodiment, the computer program product may include the method which may include: associating at least one wireless mobile node (WMN) to a plurality of APs concurrently, wherein said at least one WMN and said plurality of APs are part of the WNAS.

BRIEF DESCRIPTION OF THE DRAWINGS

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

TABLE 1

| Acronym | Definition |
| --- | --- |
| AP | Access Point |
| cmpTCP | concurrent multipath transport control protocol |
| DCF | distributed coordination function mode |
| FCFS | first-come-first-served queue |
| MICS | Media Independent Command Services |
| MIIS | Media Independent Information Services |
| MAC | medium access control |
| PHY | physical layer |
| PCF | point coordination function mode |
| WMN | Wireless Mobile Node |
| IPv4 | IP version 4 |
| RTxQ | real or virtual retransmission queue |
| TxQ | transmission queue for storing packets to be dispatched |
| WLAN AN | Wireless Local Area Network Access Network |
| WLAN AP | Wireless Local Area Network Access Point |
| WLAN UE | Wireless Local Area Network User Equipment |

Figure 1A:
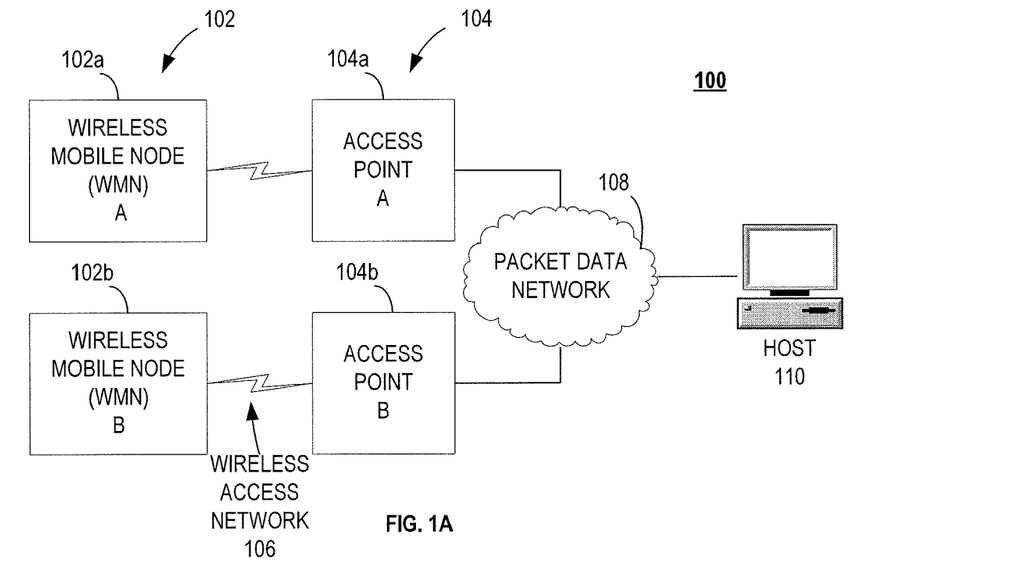
FIG. 1A depicts an exemplary wireless network environment depicting an exemplary mobile node associated with an access point according to an exemplary embodiment of the present invention.

FIG. 1 depicts an exemplary network environment 100 illustrating an exemplary embodiment of a wireless access network 106, in an exemplary embodiment, a wireless local area network (WLAN), according to one exemplary embodiment of the present invention. The wireless access network (AN) 106 may include one or more WLAN user equipment (UE) wireless mobile nodes (WMNs) 102a, 102b (collectively 102) that may access the wireless access network 106 via one or more access points (APs) 104a, 104b (collectively 104). MN 102 may be permitted to roam between APs 104a and 104b, i.e., between hotspots, or between subnets within a hotspot. The APs 104 may be coupled in turn to a packet data network 108 to access other network nodes 110. APs 104 may operate via one of various well known protocols such as, e.g., but not limited to, wireless LANs compliant with IEEE std. 802.11a, b, d or g, such as, e.g., but not limited to, IEEE std. 802.11a, b, d and g, (including, e.g., IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc.).

Overview

Conventionally, a wireless mobile node (WMN) 102 may be associated with only one of any available access points (APs) 104, which has conventionally required carefully monitoring loads on all APs 104 and creating an association with the AP 104 that provides best service under the current network conditions. However, network conditions change dynamically and an AP 104 with the best possible service potential at a given instant may be not the best possible AP 104 at the next given instant. By associating each WMN 102 with many APs, according to an exemplary embodiment, all APs 104 may share the work load of all WMNs. Thus, a given WMN 102 may receive service from the AP 104 that has the least demand from other WMNs.

Figure 1B:
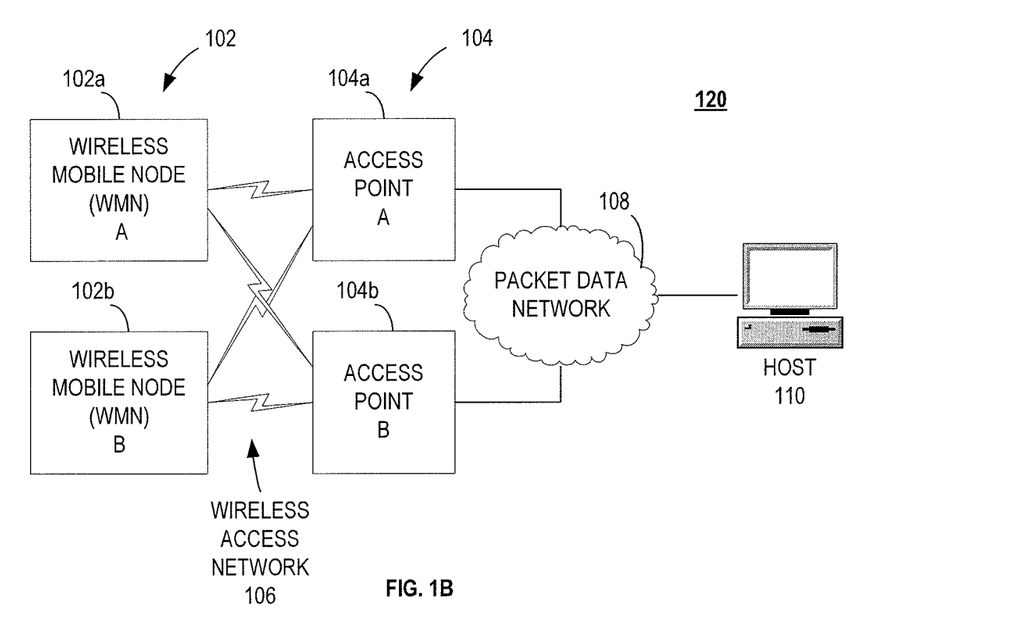
FIG. 1B depicts an exemplary wireless network environment depicting an exemplary mobile node associated with a plurality of access points according to an exemplary embodiment of the present invention.

FIG. 1B depicts an exemplary embodiment of the present invention, setting forth a useful, novel, and nonobvious method for associating WMNs 102 to APs 104 in busy wireless access networks 106. According to an exemplary embodiment, a system, method or computer program product may associate each WMN 102 with a plurality of APs 104 for mitigating any load balancing problem in hot-spots. The proposed method, according to an exemplary embodiment, may use concurrent multipath transport control protocols (cmpTCPs) in a plurality of end-points.

The inventor has proposed, developed, and modeled several cmpTCPs. The concurrent connections may be established and maintained with the help of functionality of an emerging standard, including, e.g., but not limited to, IEEE 802.21. An analytical model for the proposed system, according to an exemplary embodiment, has been developed. Numerical evaluation of the closed form solution of the proposed model shows that the proposed model outperforms the best WMN-AP association method, if all WMNs 102 are within the communication range of the APs.

The proposed system, according to an exemplary embodiment, may keep the AP 104 utilization approximately the same but may reduce expected service queue length of APs, and may reduce expected waiting time for receiving services from APs.

Exemplary commercial applications of the technology may include faster and better access to local area networks, metropolitan area networks, wide area networks, and the Internet using many wireless technologies, including, e.g., but not limited to:

IEEE 802.11 family in the United States,
HyperLAN2 in Europe,
HiSWANa and HOMELINK in Japan,
Wireless home networks and office networks, and
Better quality voice and video communication over the interne.

An exemplary embodiment of the present invention solves a problem of load balancing between several wireless access points (APs) and improves performance of wireless communications in areas serving many users simultaneously, such as in airports, public hotspots, or the like.

An exemplary embodiment of the present invention sets forth a multipath transport protocol to be utilized at novel access network systems and routers. The crux of an exemplary embodiment of the present invention is the association of a wireless mobile device simultaneously with a plurality of access points located within a reception range.

Introduction

IEEE 802.11 based wireless local area network (WLAN) technology enables a wireless mobile node (WMN) to connect to the Internet via access points (APs). To support demand, many public areas, such as, e.g., but not limited to, parks, hotels, restaurants, and shopping malls have installed many APs. In many hot-spots a WMN 102 is within communication range of many APs 104 and it can associate to any of them. AP-WMN Association Problem: The default rule associates a WMN 102 to the AP 104 with highest signal strength the MN senses. Usually WMNs are unevenly distributed over an area that is covered by many APs 104 and the default AP-WMN association method does not distribute WMNs 102 to the APs 104 evenly. Thus, while available bandwidth-resource of some APs 104 are under used, the other APs 104 have too many users for providing enough bandwidth for all WMNs. This is known as AP-WMN association problem. To overcome this problem, many AP-WMN association algorithms have been proposed. The basic idea behind these algorithms is to distribute association of WMNs 102 to APs 104 for maximizing or minimizing an objective function; see references below noted as [4], [5], [7], [12]. These algorithms require direct or indirect monitoring of load on each AP 104. Because of space limitation and disparate approaches we do not provide reviews of these algorithms here. The present invention, according to an exemplary embodiment, overcomes the AP-WMN association problem while requiring no AP 104 load monitoring, and using concurrent multipath transmission control protocol (cmpTCP)-Concurrent Multi-path Transport from Trans-port Layer: Reduced cost of Network Interface Cards (NICs) and development of standard for multihoming protocols such as Stream Control Transmission Protocol (SCTP), see [13], has led to creation of many concurrent multipath transport protocols (cmpTCPs). A cmpTCP transports a single datastream from an application through multiple paths for accumulating bandwidth, increasing reliability and availability, and balancing load on multiple paths. According to an exemplary embodiment, cmpTCP may be used for balancing load on multiple APs 104. According to an exemplary embodiment, instead of finding an optimal association for a WMN 102 to an AP 104, one may wirelessly connect a WMN 102 to many APs 104, simultaneously. The connection may be made and maintained from the transport layer with one of the cmpTCP-type transport layer protocols. According to an exemplary embodiment, one may use functionalities of the IEEE 802.21 standard for retrieving resource information from the APs 104. According to an exemplary embodiment, analytical models of the proposed WLAN access method are described below. According to an exemplary embodiment, a closed form solution for AP 104 utilization, expected queue length, and waiting time for the WMNs 102, are provided. According to an exemplary embodiment, comparison of these performance parameters with that of a hypothetical, optimal AP-WMN association scenario shows that the proposed method outperforms the optimal AP-WMN association.

A Brief Overview of Concurrent Multipath Transport Control Protocol (cmpTCP)

An exemplary concurrent multipath transport control protocol (cmpTCP), as may be used in one exemplary embodiment of the present invention is set forth in an article by Sarkar, Dilip "A CONCURRENT MULTIPATH TCP and Its Markov Model," dated November, 2005, the contents of which are incorporated herein by reference in their entirety, a copy of which is included attached hereto as Appendix I.

According to an exemplary embodiment, a standard transport-layer protocol may utilize a transmission queue (TxQ) for storing packets to be dispatched and a real or virtual retransmission queue (RTxQ) for saving packets that have been dispatched, but yet to be acknowledged by a receiver. According to an exemplary embodiment, a transport-layer protocol for utilizing multiple paths concurrently may use more than one TxQ and/or RTxQ. According to an exemplary embodiment, based on the number and locations of TxQs and RTxQs at the sending end, Concurrent Multipath Transmission Control Protocols (cmpTCPs) can be divided into three generic categories: (i) one TxQ and one RTxQ for all destinations/paths, (ii) one TxQ and one RTxQ for each destination/path, and (iii) one TxQ for all destinations/paths and one RTxQ for each destination/path. Further details about these three categories of protocols can also be found in referenced articles, see [10].

Figure 1C:
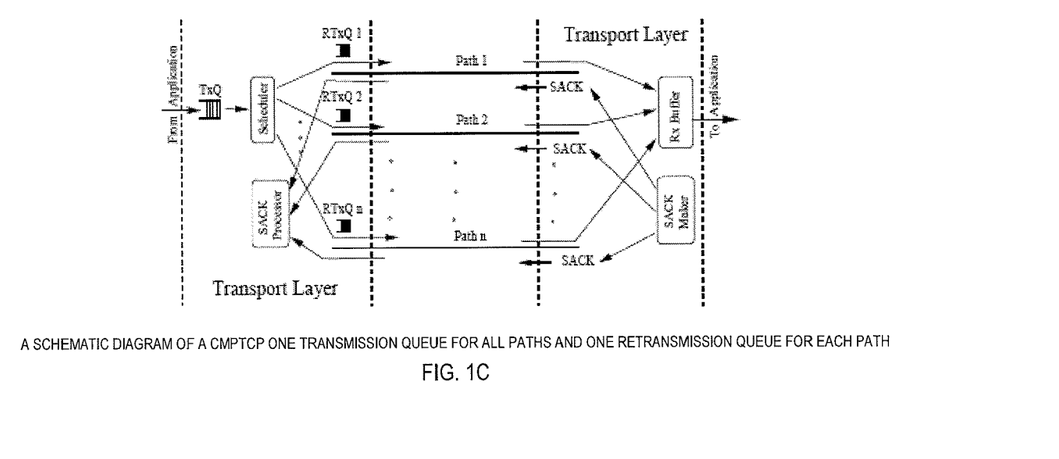
FIG. 1C depicts an exemplary schematic diagram depicting an exemplary cmpTCP with one transmission queue for all paths and one retransmission for each path according to an exemplary embodiment of the present invention.

According to an exemplary embodiment, the category of protocols to be used for the proposed multiple AP 104 association system is shown in FIG. 1C; it has one common TxQ for all destinations, but one RTxQ for each destination. There is a scheduler that distributes the packets from the TxQ to the destinations for dispatching. As soon as a packet in a RTxQ is acknowledged by the receiver, it is removed from the RTxQ. If the number of gap reports for a packet in a RTxQ exceeds a threshold, say four, it may be moved from its RTxQ to the TxQ, according to an exemplary embodiment. This packet may stay in the TxQ until it reaches the front of the queue. At that point the scheduler may assign it to a destination for dispatching. Since in this category of protocols, scheduling is delayed until dispatching time, it can use most recent status of the transmission paths for dispatching a packet. Protocols reported in [9] and [10] fall in this category.

III. ACCESS POINT AND MOBILE NODE MODELS

A. IEEE 802.11 MAC Modes

IEEE 802.11 Standards define medium access control (MAC) and physical layer (PHY) for wireless access to wired local area networks (LANs) and WLANs[1]-[3],[14]. This work does not involve PHY, and hence only necessary concepts of MAC are discussed here. A WMN 102 can control medium access in distributed coordination function (DCF) or point coordination function (PCF) modes. In the PCF operating mode, a group of WMNs 102 access a LAN or WLAN via a node, which coordinates contention-free access by scheduling media access. The node providing access to the network is called an access point (AP). The AP 104 can have either wire or wireless connection to the LAN or WLAN.

B. Access Point Model

Figure 2:
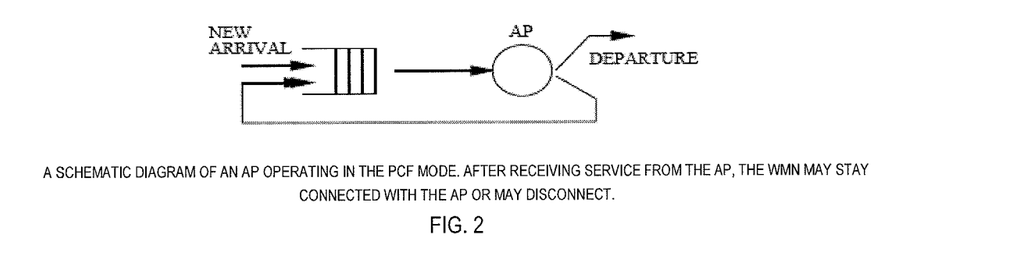
FIG. 2 depicts an exemplary schematic diagram depicting an exemplary AP operating in a PCF mode, according to an exemplary embodiment where, after receiving service from the exemplary AP, a given exemplary WMN may remain connected with the AP or may disconnect according to an exemplary embodiment of the present invention.

For this study it may be assumed that an AP 104 is operating in PCF mode, is wire connected to fixed-infrastructure LAN, and is serving all WMNs 102 associated to it from a first-come-first-served (FCFS) queue. Each AP 104 has a limited transmission range and the AP 104 can serve only WMNs 102 in its range. It is assumed that adjacent APs 104 use non-interfering channels. Thus, transmissions to and from an AP 104 do not interfere with transmissions of other APs. Such interference free channel allocation can be obtained by allocating orthogonal transmission codes or frequency planning. After receiving service from an AP 104 a WMN 102 rejoins the queue with probability p1 or it disassociates from the AP 104 with probability $p_0$, where $p_1+p_0=1$. An exemplary schematic diagram of a queuing model of an AP 104 with one FCFS queue is shown in FIG. 2, according to an exemplary embodiment of the present invention. In the next section we develop an analytical model for this closed queuing network model. For basic introduction to closed queuing models interested readers may refer to [11].

IV. PROPOSED CONCURRENT WIRELESS NODE ASSOCIATION SCHEME

Figure 3:
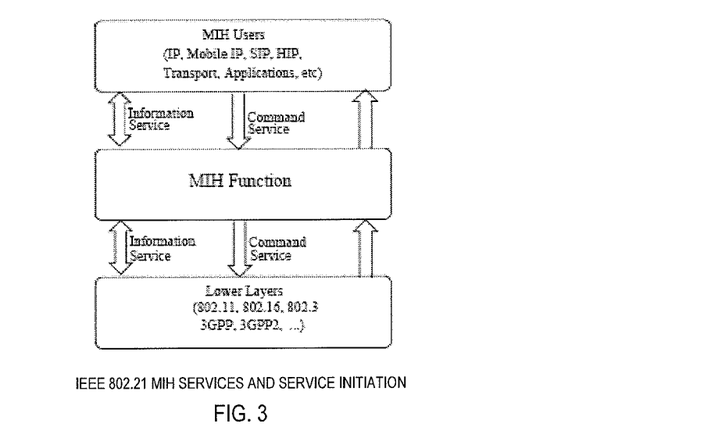
FIG. 3 depicts an exemplary diagram depicting an exemplary IEEE 802.21 MIH services and initiation, according to an exemplary embodiment of the present invention.

All the assumptions made about APs 104 and their operating mode in the previous paragraph are valid for the proposed model. In addition, it is assumed that WMNs 102 are equipped with necessary hardware and software for associating with multiple APs 104 simultaneously. It is assumed that the WMNs 102 have a cmpTCP-type transport-layer protocol for dispatching data packets to its destination(s), and receiving data packets from its destination nodes via any of the APs 104 [6], [9], [10]. For establishing multiple associations with APs 104 and maintaining them a WMN 102 can use Media Independent Command Services (MICS) and Media Independent Information Services (MIIS) of emerging IEEE 802.21 standard [8]. As shown in FIG. 3, the transport (or application) layer of an IEEE 802.21 enabled WMN 102 can request service information from lower layer via MIH Function layer. Based on the received information, the transport (or application) layer can request services from the available APs.

Figure 4:
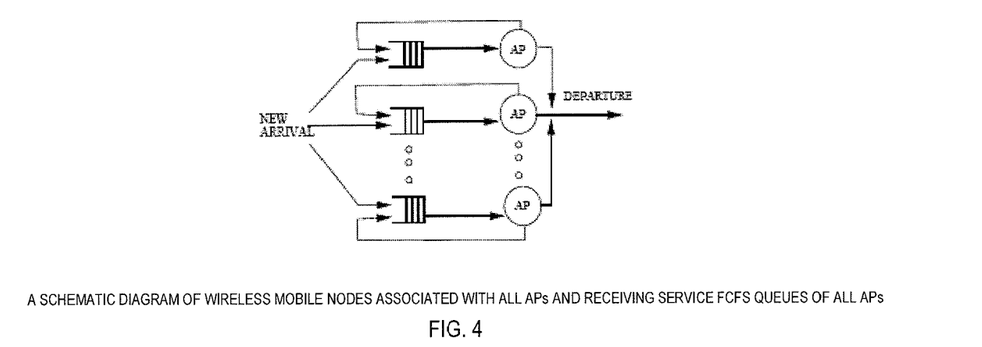
FIG. 4 depicts an exemplary schematic diagram illustrating exemplary wireless nodes associated with all APs, and receiving service from FCFS queues of all APs according to an exemplary embodiment of the present invention.

On arrival a WMN 102 associates with all k available APs, that is, all k APs 104 of the k-AP 104 system place the WMN 102 in their FCFS queues. When it reaches to the front of an AP's FCFS queue, it is served by the AP. When an AP 104 disassociates from the system, it is removed from the service queues of APs. The associated closed-queuing model is shown in FIG. 4. Note that all the nodes in the k-AP system are in each of the FCFS queue. Thus, a WMN 102 is present in k queues, but its position in the queues could be different because of service-time variation of the WMN 102 during different visits to APs.

V. ANALYTICAL MODELS FOR ACCESS POINT

In this section, first we develop a Markov model for a single AP 104 serving WMNs. The results obtained for one AP 104 will serve as the baseline for comparison with multiple concurrent AP 104 system proposed here. The Markov model for the proposed multiple concurrent AP 104 system will be presented later in this section.

A. Service from One AP

Figure 5:
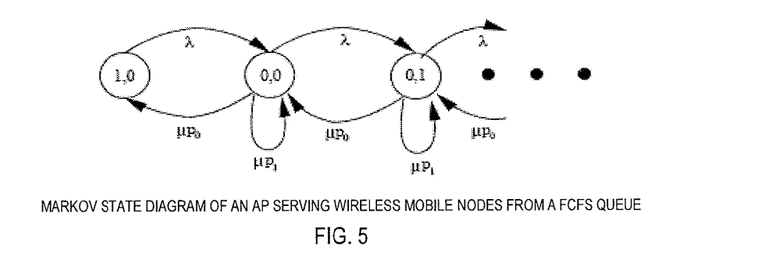
FIG. 5 depicts an exemplary Markov state diagram illustrating an exemplary AP serving wireless nodes from a FCFS queue, according to an exemplary embodiment of the present invention.

It is assumed that WMNs 102 associating to the AP 104 form a Poisson Process with average arrival rate of λ. Service time of the WMNs 102 during visits is independent and exponentially distributed. The average service time is (1/μ). Recall that after each visit a WMN 102 may stay connected with the AP 104 with probability p1 and disconnect with probability $(1-p_1)=p0$. It is assumed that over a long period the number of WMNs 102 associating with it is equal to the number of WMNs 102 disassociating from it. This system forms a Markov process and it can be rep-resented as a Markov chain. Markov state diagram of the system is shown in FIG. 5. Let the set of possible states be represented by $S=\{S(1,0), S(0,0), S(0,1), \ldots, \}$. The first index indicates the number of APs 104 idle and the second index indicated the number of WMNs 102 waiting for receiving service. While the system is in the state S(1,0), service queue is empty and the AP 104 is idle. In the states S(0,i), i≥0 the AP 104 is serving a WMN 102 and i WMNs 102 are waiting in the queue. Let the steady-state probability of being in the state S(1,0) be represented by P(1,0) and the steady-state probability of being in the states S(0,i), i≥0 be represented by P(0,i).

Transition rate from the state S(1,0) to S(0,0) must be equal to that from state S(0,0) to S(1,0). This fact can be represented as, $$\mu p_0 P(0, 0) = \lambda P(1, 0) \quad (1)$$

$$\text{Or } P(0, 0) = \rho P(1, 0), \text{ where } \rho = \frac{\lambda}{\mu p_0} \quad (2)$$

Similarly, transition from the state $S(0,i-1)$ to the state $S(0,i)$ must be equal to that from the state $S(0,i)$ to the state $S(0,i-1)$, for $i>0$. Using the notation just introduced we can mathematically write this as, $$P(0, i) = \rho P(0, i-1) \quad (3)$$
$$= \rho^2 P(0, i-2) = \ldots = \rho^{i+1} P(1, 0)$$

Now considering the normalization condition we can write, $$P(1, 0) + \sum_{i=0}^{\infty} P(0, i) = P(1, 0) + \sum_{i=0}^{\infty} \rho^{i+1} P(1, 0) = 1 \quad (4)$$

$$\text{Or, } P(1, 0) \sum_{i=0}^{\infty} \rho^i = 1 \Rightarrow P(1, 0) = (1-\rho) \quad (5)$$

For given arrival rate, service rate, and probability of staying connected after receiving service the steady state probability of the Markov states can be computed from Equations 5 and 3. First the probability $P(1,0)$ is calculated using Equation 5. The other steady state probabilities can be computed from Equation 3. Only at the state $S(1,0)$ the AP 104 is idle, and hence the utilization, U of the AP 104 is given by, $$U = 1 - P(1,0) = 1 - (1-\rho) = \rho \quad (6)$$

The expected queue length $L_1$ is given by, $$L_1 = \sum_{i=1}^{\infty} i P(0, i) = \sum_{i=1}^{\infty} i P(0, i) = \sum_{i=1}^{\infty} i \rho^{i+1} P(1, 0) \quad (7)$$
$$= \rho(1-\rho)[\rho + 2\rho^2 + 3\rho^3 + \ldots]$$
$$= \frac{\rho^2}{(1-\rho)}$$

B. Service from Multiple Concurrent APs

Figure 6:
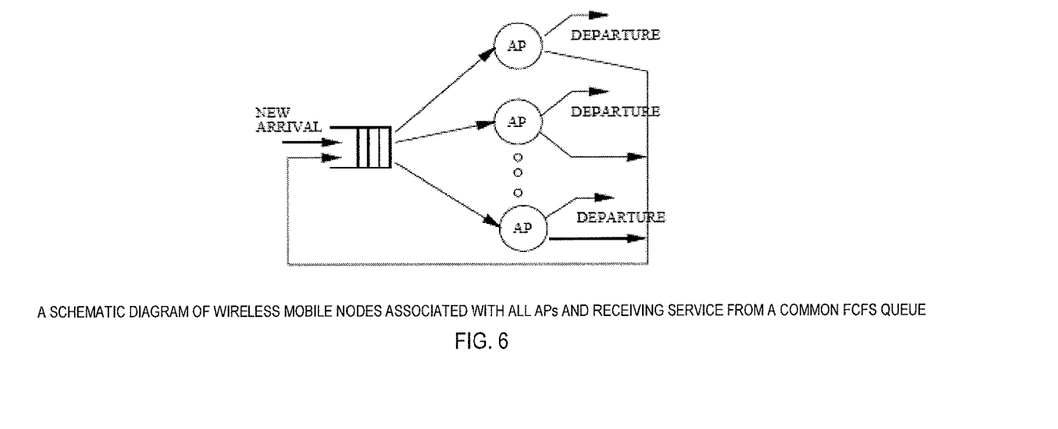
FIG. 6 depicts an exemplary schematic diagram depicting exemplary wireless nodes associated with all APs, and receiving service from a common FCFS queue according to an exemplary embodiment of the present invention.

Although a WMN 102 may receive service from one or more APs 104 simultaneously, the analytical model in this section assumes that a WMN 102 receives service from only one AP 104 at a time. Note that every AP 104 maintains its own FCFS queue. It selects the next WMN 102 to be served from its queue. If a WMN 102 is getting service from an AP 104 or has no packet to send it is placed to the end of the queue. Once a WMN 102 dissociates from an AP 104 it is removed from the service queue. Since all APs 104 have same set of WMNs 102 in their service queue, for our modeling purpose we consider only one queue. The modified queuing model of the proposed system is shown in FIG. 6.

Figure 7:
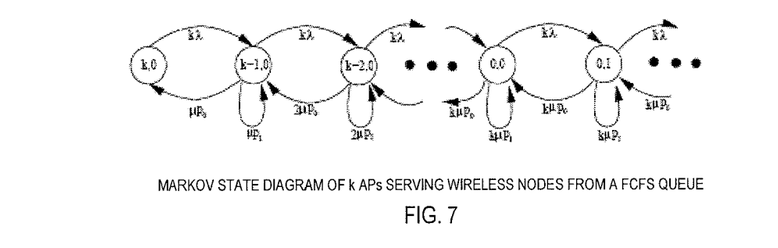
FIG. 7 depicts an exemplary Markov state diagram illustrating an exemplary k APs serving wireless nodes from a FCFS queue, according to an exemplary embodiment of the present invention.

Now we develop a Markov model for the system where a WMN 102 concurrently connects (or couples) to multiple (a plurality) of APs. Let us assume that a WMN 102 is connected to k APs 104 concurrently. To keep average load equal to that of a single AP 104 system, the arrival rate for this system is assumed to be k times that of the single AP 104 system, that is, arrival rate is $k\lambda$. The connection continuation or termination probability after receiving service is retained same as single AP 104 system. A Markov state transition diagram is shown in FIG. 7. Let the set of states be $S=\{S(k,0), S(k-1,0), \ldots, S(1,0), S(0,0), S(0,1), \ldots\}$. When the system is in the state $S(k-j,0)$, j APs 104 are serving j WMNs, (k-j) APs are idle, and no WMN 102 is waiting for service. In the state $S(0,0)$, kWMNs are served by k APs, no AP 104 is idle, and no WMN 102 is waiting for service.

Since arrival rate is $k\lambda$ and the probability of being in the state $S(k,0)$ is $P(k,0)$, the transition rate from the state $S(k,0)$ to $S(k-1,0)$ is $k\lambda P(k,0)$. For calculating transition rate from $S(k-1,0)$ to $S(k,0)$ we note that the only WMN 102 being served while in the state $S(k-1,0)$ may leave the system at the rate of $\mu p0$ and the probability of being in the state $S(k-1,0)$ is $P(k-1,0)$. Thus, transition rate from state $S(k-1,0)$ to $S(k,0)$ is $\mu p_0 P(k-1,0)$, and because transition rate from $S(k,0)$ to $S(k-1,0)$ must be equal to that from the state $S(k-1,0)$ to $S(k,0)$, we have:

$$\mu p_0 P(k-1,0) = k\lambda P(k,0) \Rightarrow P(k-1,0) = k\rho P(k,0) \quad (8)$$

Similarly, noting that the arrival rate of the WMNs 102 remains the same but one of the two WMNs 102 being served while in the state $S(k-2,0)$ may disassociate after service, and equating transition rates between $S(k-1,0)$ and $S(k-2,0)$ we get, $$P(k-2, 0) = \frac{k}{2}\rho P(k-1, 0) = \frac{k^2}{2!}\rho^2 P(k, 0) \quad (9)$$

In general, equating the transitions rates between states $S(k-j,0)$ and $S(k-j+1,0)$, for $0<j<k$, we get:

$$P(k-j, 0) = \frac{k^j}{j!}\rho^j P(k, 0) \quad (10)$$

The state $S(0,0)$ is an ideal situation where every WMN 102 is getting service, and no AP 104 is idle. The steady state probability of this state is given by, $$P(0, 0) = \frac{k^k}{(k)!}\rho^k P(k, 0) = \frac{k^{k-1}}{(k-1)!}\rho^k P(k, 0) \quad (11)$$

While in states $S(0,i)$, for $i\geq 0$, all the APs 104 are busy and i WMNs 102 are waiting in the queue for receiving service from one of the k APs.

$$P(0, i) = \rho^i P(0, 0) = \frac{k^{k-1}}{(k-1)!}\rho^{k+i} P(k, 0) \quad (12)$$

Because of normalization conditions we get, $$\left(\sum_{j=0}^{k-1} P(k-j, 0)\right) + \left(\sum_{i=0}^{\infty} P(0, i)\right) = 1 \quad (13)$$

Note that the first summation term in Equation 13 gives the probability that one or more APs 104 are idle and the second summation term gives the probability that all the APs 104 are busy serving WMNs. Substituting values of $P(k-j,0)$ and $P(0,i)$ from Equations 10 to 12 we can find the probability that all the APs 104 are idle. Before we do so, we will evaluate second summation first.

$$\sum_{i=0}^{\infty} P(0, i) = P(0, 0) + P(0, 1) + \ldots + P(0, i) + \ldots \qquad (14)$$

$$= P(0, 0)[1 + \rho + \rho^2 + \ldots + \rho^i + \ldots]$$

$$= \frac{k^{k-1}}{(k-1)!} \rho^k P(k, 0) \left[\frac{1}{1-\rho}\right]$$

$$= \frac{k^{k-1}}{(k-1)!} \left(\frac{\rho^k}{1-\rho}\right) P(k, 0)$$

Now replacing the second summation of the Equation 13 with the right hand side of Equation 14, we get:

$$\left(\sum_{j=0}^{k-1} P(k-j, 0)\right) + \frac{k^{k-1}}{(k-1)!} \left(\frac{\rho^k}{1-\rho}\right) P(k, 0) = 1 \qquad (15)$$

The left hand side of this equation can be rewritten as, $$P(k, 0)\left(1 + k\rho + \frac{k^2}{2!}\rho^2 + \ldots + \frac{k^{k-1}}{(k-1)!}\rho^{k-1} + \frac{k^{k-1}}{(k-1)!}\left(\frac{\rho^k}{1-\rho}\right)\right) P(k, 0) =$$

$$P(k, 0)\left(1 + k\rho + \frac{k^2}{2!}\rho^2 + \frac{k^3}{3!}\rho^3 + \ldots\right)\left(\frac{1-\rho}{1-\rho}\right) +$$

$$P(k, 0)\left(\frac{\left(\frac{k^{k-1}}{(k-1)!}\rho^{k-1}(1-\rho) + \frac{k^{k-1}}{(k-1)!}\rho^k\right)}{1-\rho}\right) =$$

$$P(k, 0)\left(\frac{1(1-\rho) + k\rho(1-\rho) + \frac{k^2}{2!}\rho^2(1-\rho) + \ldots}{1-\rho}\right) +$$

$$P(k, 0)\left(\frac{\left(\frac{k^{k-1}}{(k-1)!}\rho^{k-1}(1-\rho) + \frac{k^{k-1}}{(k-1)!}\rho^k\right)}{1-\rho}\right) =$$

$$P(k, 0)\left(\frac{1 - \rho + k\rho - k\rho^2 + \frac{k^2}{2!}\rho^2 - \frac{k^3}{2!}\rho^3 + \ldots}{1-\rho}\right) +$$

$$P(k, 0)\left(\frac{\left(\frac{k^{k-1}}{(k-1)!}\rho^{k-1}(1-\rho) + \frac{k^{k-1}}{(k-1)!}\rho^k\right)}{1-\rho}\right) =$$

$$P(k, 0)\left(\frac{1 + (k\rho - \rho) + \left(\frac{k^2}{2!}\rho^2 - k\rho^2\right) + \ldots}{1-\rho}\right) +$$

$$P(k, 0)\left(\frac{\left(\frac{k^{k-1}}{(k-1)!}\rho^{k-1} - \frac{k^{k-1}}{(k-1)!}\rho^k + \frac{k^{k-1}}{(k-1)!}\rho^k\right)}{1-\rho}\right) =$$

$$P(k, 0)\left(\frac{1 + (k-1)\rho + \frac{(k-2)k\rho^2}{2!} + \ldots + \frac{k^{k-2}\rho^{k-1}}{(k-1)!}}{1-\rho}\right)$$

Using this simplified expression in Equation 15 we get, $$P(k, 0) = \frac{1-\rho}{1 + (k-1)\rho + \frac{(k-2) \cdot k^3 \rho^2}{2!} + \ldots + \frac{k^{k-2}\rho^{k-1}}{(k-1)!}} \qquad (16)$$

$$= \frac{1-\rho}{1 + \sum_{j=1}^{k-1} \frac{(k-j)k^{j-3}}{j!}\rho^j}$$

For a given number of APs, arrival rate, service rate, and probability of staying connected after receiving service the steady state probability of the Markov states can be computed from Equations 10, 11, 12, and 16. First the probability $P(k,\mathbf{0})$ is calculated using Equation 16. The other steady state probabilities can be computed from Equations 10, 11, and 12. For any system the load $\rho$ must be less than 1, and hence some of the APs 104 are going to be idle for sometime. Let I be the expected fraction of idle APs. When the system is at state $S(k-j,\mathbf{0})$, for $0 \leq j < k$, the fraction of idle APs 104 is given by $(k-j)/k$, and the probability of being in this state is $P(k-j,\mathbf{0})$. Thus, I can be computed as a weighted sum.

$$I = \sum_{j=0}^{k-1} \frac{(k-j)}{k} P(k-j, 0) \qquad (17)$$

$$= \frac{k}{k} P(k, 0) + \frac{k-1}{k} P(k-1, 0) + \ldots + \frac{1}{k} P(1, 0)$$

$$= P(k, 0)\left[1 + \frac{k-1}{k} k\rho + \ldots + \frac{1}{k} \cdot \frac{k^k - 1}{(k-1)!}\rho^{k-1}\right]$$

$$= P(k, 0)\left[1 + \frac{k-1}{k} k\rho + \ldots + \frac{1}{k} \cdot \frac{k^k - 1}{(k-1)!}\rho^{k-1}\right]$$

$$= P(k, 0)\left[1 + (k-1)\rho + \ldots + \frac{k^{k-2}}{(k-1)!}\rho^{k-1}\right]$$

$$= P(k, 0)\left[1 + \sum_{j=1}^{k-1} \frac{(k-j)k^{j-1}}{j!}\rho^j\right]$$

Now substituting the value of $P(k,\mathbf{0})$ from the Equation 16 we get, $$I = 1 - \rho \qquad (18)$$

Therefore the utilization of the APs 104 is given by, $$U = 1 - I = 1 - (1-\rho) = \rho \qquad (19)$$

Comparing Equations 6 and 19, we can conclude that the AP 104 utilization of the proposed system is same as the ideal distribution of WMNs 102 among the APs. Next, we find a closed form equation for expected number of WMNs, $L_k$, waiting for service.

$$L_k = \sum_{i=1}^{\infty} i P(0, i) \qquad (20)$$

$$= \sum_{i=1}^{\infty} i \cdot \frac{k^{k-1}}{(k-1)!} \rho^{k+i} P(k, 0)$$

$$= \frac{k^{k-1}}{(k-1)!} \rho^k P(k, 0) \sum_{i=1}^{\infty} i \cdot \rho^i$$

$$= \frac{k^{k-1}}{(k-1)!} \rho^k \cdot \frac{\rho}{(1-\rho)^2} P(k, 0)$$

After substitution of the expression for $P(k,\mathbf{0})$ from Equation 16 and canceling terms we get, $$L_k = \frac{\rho^2}{(1-\rho)} \cdot \frac{\frac{k^{k-1}\rho^{k-3}}{(k-1)!}}{1 + \sum_{j=1}^{k-1} \frac{(k-j)k^{(j-3)}}{j!}\rho^j} \qquad (21)$$

The first term of the right-hand side of this equation is the queue length for one AP 104 (see Equation 7). Thus, it can be rewritten as, $$L_k = L_1 \cdot \frac{\frac{k^{k-2}\rho^{k-1}}{(k-1)!}}{1 + \sum_{j=1}^{k-1} \frac{(k-j)k^{(j-3)}}{j!}\rho^j} \quad (22)$$

For stability requirement load $\rho$ must be less than one. Under this condition we show that $L_k < L_1$ for $\rho < 1$. We state this fact as a theorem and outline a proof next.

Theorem: Let the arrival rate of a k-AP system be k times greater than that of a one-AP system, and let the per AP service rate be same for all APs, that is, per AP load let $\rho$ be same for both one-AP and k-AP systems. If $\rho < 1$ and $k > 1$, then the expected queue length of the k-AP system is smaller than the expected queue length of one-AP system, that is, $L_k < L_1$.

Proof: For paving this theorem we show that the second term of the Equation 22 is smaller than one that is, $$\frac{k^{k-2}\rho^{k-1}}{(k-1)!} < \left(1 + \sum_{j=1}^{k-1} \frac{(k-j)k^{j-2}}{j!}\rho^j\right)$$

for $\rho < 1$. We begin with the right hand side of the inequality.

$$\left(1 + \sum_{j=1}^{k-1} \frac{(k-j)k^{j-1}}{j!}\rho^j\right) =$$

$$1 + (k-1)\rho + (k-2)\frac{k}{2!}\rho^2 + \ldots + \frac{k^{k-2}}{(k-1)!}\rho^{k-1} >$$

$$\left(1 + (k-1) + (k-2)\frac{k}{2!} + \ldots + \frac{k^{k-2}}{(k-1)!}\right)$$

$$\rho^{k-1} \; [\text{Since } (\rho < 1) \text{ and } (k > 1).] =$$

$$\left(1 + k - 1 + \frac{k^2}{2!} - k + \frac{k^3}{3!} - \frac{k^2}{2!} + \ldots + \frac{k^{k-2}}{(k-2)!} - \frac{k^{k-3}}{(k-3)!} + \right.$$

$$\left. \frac{k^{k-1}}{(k-1)!} - \frac{k^{k-2}}{(k-2)!}\right)\rho^{k-1} = \frac{k^{k-1}\rho^{k-1}}{(k-1)!} \Rightarrow$$

$$\left(1 + \sum_{j=1}^{k-1} \frac{(k-j)k^{j-1}}{j!}\rho^j\right) > \frac{k^{k-1}\rho^{k-1}}{(k-1)!} \text{ for } \rho < 1 \text{ and } k > 1.$$

This completes the proof. In the next section we use these equations to see how much improvements are obtained for different loads and different number of APs.

VI. NUMERICAL RESULTS

Figure 8:
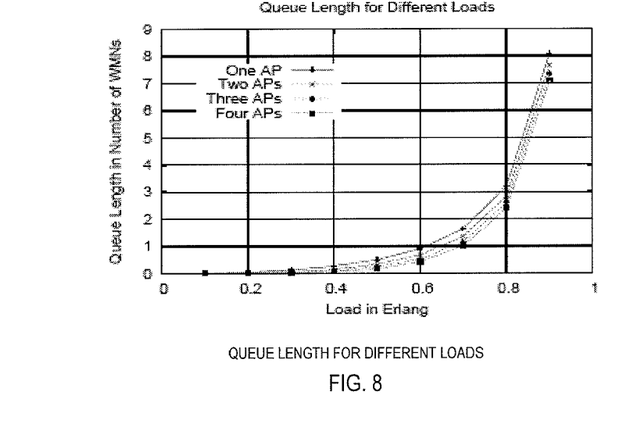
FIG. 8 depicts an exemplary chart graphing queue length for different loads, graphing queue length in number of WMNs for a load in Erlang, for one, two, three and four APs according to an exemplary embodiment of the present invention.
Figure 9:
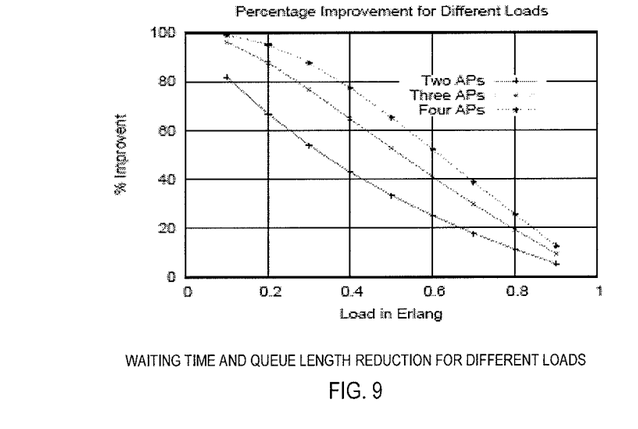
FIG. 9 depicts an exemplary chart graphing waiting time and queue length reduction for different loads, indicating percentage improvement for different loads including the percentage improvement graphed by load in Erlang for two, three and four APs according to an exemplary embodiment of the present invention.

We use Equations 7 and 22 for computing queue lengths for single-AP and multiple AP 104 systems, respectively. The load is varied from 0.1 to 0.9 Erlang and the number of APs 104 is varied from one to four. The obtained queue lengths are shown in Table I and also illustrated in the plots of FIG. 8. Both from the table and the plots it is clear that the k-AP systems reduce the queue length. The improvement varies with load, but relatively higher percentage improvements are observed at lower loads (see FIG. 9).

TABLE I

QUEUE LENGTH FOR DIFFERENT LOADS.

| Load | Queue Length for | | | |
|------|------------------|---|---|---|
|      | One AP | Two APs | Three APs | Four APs |
| 0.90 | 8.10 | 7.67 | 7.35 | 7.09 |
| 0.80 | 3.20 | 2.84 | 2.59 | 2.39 |
| 0.70 | 1.63 | 1.35 | 1.15 | 1.00 |
| 0.60 | 0.90 | 0.68 | 0.53 | 0.43 |
| 0.50 | 0.50 | 0.33 | 0.24 | 0.17 |
| 0.40 | 0.27 | 0.15 | 0.09 | 0.06 |
| 0.30 | 0.13 | 0.06 | 0.03 | 0.02 |
| 0.20 | 0.05 | 0.02 | 0.01 | 0.00 |
| 0.10 | 0.01 | 0.00 | 0.00 | 0.00 |

While expected queue length depends only on the load, the expected waiting time, requires us to know the arrival rate $\lambda$, since by Little's Law $W_k = L_k/\lambda$. Let us assume that unit of time is minutes, and the arrival rate is 0.1 WMN per minute. For this assumption, the waiting time is 10 times the queue length. For instance, from Table I, we can determine that for load of 0.8 Erlang a WMN 102 waits 23.86 minutes in a 4-AP system but for the same load in a single AP 104 system a WMN 102 expected to wait 32.00 minutes. Thus, in a 4-AP system waiting time is 25.45% lower. From the plots in FIG. 9 we can see that the improvement increases as the load decreases. If five minutes or lower is considered reasonable waiting time, it is necessary to have a load of 0.5 Erlang or lower for a single AP 104 system. The expected waiting time improvements for a load of 0.5 Erlang are 33.33%, 52.63% and 65.22% for 2-AP, 3-AP, and 4-AP systems, respectively.

VII. CONCLUSION

In this paper we have proposed a novel method for associating WMNs 102 to APs 104 in busy wireless access networks 106. The proposed method associates each WMN 102 with many APs 104 for mitigating load balancing problem in hot-spots. The proposed method assumes that cmpTCP-type transport protocols are used in the end-points. The connections are established and maintained with the help of emerging IEEE 802.21 standard. An analytical model for the proposed system has been developed. Numerical evaluation of the closed form solution of the proposed model shows that if all the WMNs 102 are within the communication range of the APs, the proposed model will outperform best WMN-AP association method where a WMN 102 can be associated to only one AP 106. Currently we are extending the proposed model for cases where the number of users is bounded (which is true for any real-world situation). We are also developing simulation model to study cases where WMN 102 arrival rates and service times do not have Markov properties.

REFERENCES

[1] IEEE 802.11a WG. *Part 11: Wireless LAN Medium Access Control (MAC) and Physical Layer (PHY) Specification: High-Speed Physical Layer in the 5 GHz Band*, 1999.

[2] IEEE 802.11b WG. *Part 11: Wireless LAN Medium Access Control (MAC) and Physical Layer (PHY) Specification: High Speed Physical Layer Extension in the 2.4 GHz Band*, 1999.

[3] IEEE 802.11g WG. *Part II: Wireless LAN medium access control (MAC) and physical layer (PHY) specifications*, 2003.

[4] Y. Bejerano, S-J. Han, and L. Li. Fairness and load balancing in wireless LANs using association control. *IEEE/ACM Transactions on Networking*, 15 (3), 2007.

[5] A. Fujiwara, Y. Sagara, and M. Nakamura. Access points election algorithms for maximizing throughputs in wireless LAN environment. In *IEEE CNF*, 2007.

[6] J. Iyengar, P. Amer, and R. Stewart. Concurrent multipath transfer using SCTP multi homing over independent end-to-end paths. *IEEE/ACM Transactions on Networking*, 14 (5):951-964, October 2006.

[7] I. Koutsopoulos and L. Tassiulas. Joint optimal access point selection and channel assignment in wireless networks. *IEEE/ACM Transactions on Networking*, 15(3), 2007.

[8] LANMAN Standards Committee of the IEEE Computer Society. *IEEE P802.21/D8.0; Draft Standard for Local and Metropolitan Area Networks: Media Independent Handover Services*, 2007.

[9] Dilip Sarkar, "A concurrent multipath TCP and its Markov model," In ICC, Istanbul, Turkey, June 2006. (See Appendix I).

[10] Dilip Sarkar and Snigdhadeb Paul. Architecture, implementation, and evaluation of cmpTCP Westwood. In *Globecom*, San Francisco, USA, November 2006.

[11] Charles H. Sauer and K. Mani Chandy. *Computer systems performance modeling*. Prentice-Hall, 1981.

[12] V. A. Siris and D. Evaggelatou. Access point selection for improving throughput fairness in wireless LANs. In *IEEE CNF*, 2007.

[13] R. Stewart, Q. Xie, K. Momeault, C. Sharp, H. Schwarzbauer, T. Taylor, I. Rytina, M. Kalla, L. Zhang, and V. Paxson. *Stream Control Transmission Protocol*. RFC 2960, IETF, October 2000.

[14] WEE 802.11 WG. *Part* 11: *Wireless LAN Medium Access Control (MAC) and Physical Layer (PHY) Specification*, 1999.

Exemplary Computer Network Environment

Although in the exemplary embodiment a user 101 (not shown) may be described as using a device referred to as a client or MN 102 that may be coupled to a device referred to as a server device, the client 102 and server devices 110, 120 need not have a client/server relationship. For example, client 102 and the server devices may be similar devices and/or may communicate in a peer-to-peer manner. Alternatively, client device 102 and the server device may be labeled first device 102 and second device, respectively. Further the devices 102, 110, 120 as described may be coupled via one or more communications links, such as, e.g., but not limited to wireless communications links. Other ways of coupling client 102 and the server may equally be used to accomplish communication such as, e.g., (but not limited to) a wired network connection, a local connection, a local area, wide area, or metropolitan area network connection, a community access television (CATV, or cable TV) connection, a satellite connection, a bus connection, an optical connection, a parallel or serial data bus, universal serial bus (USB) connection, or other bus, etc.

Figure 10:
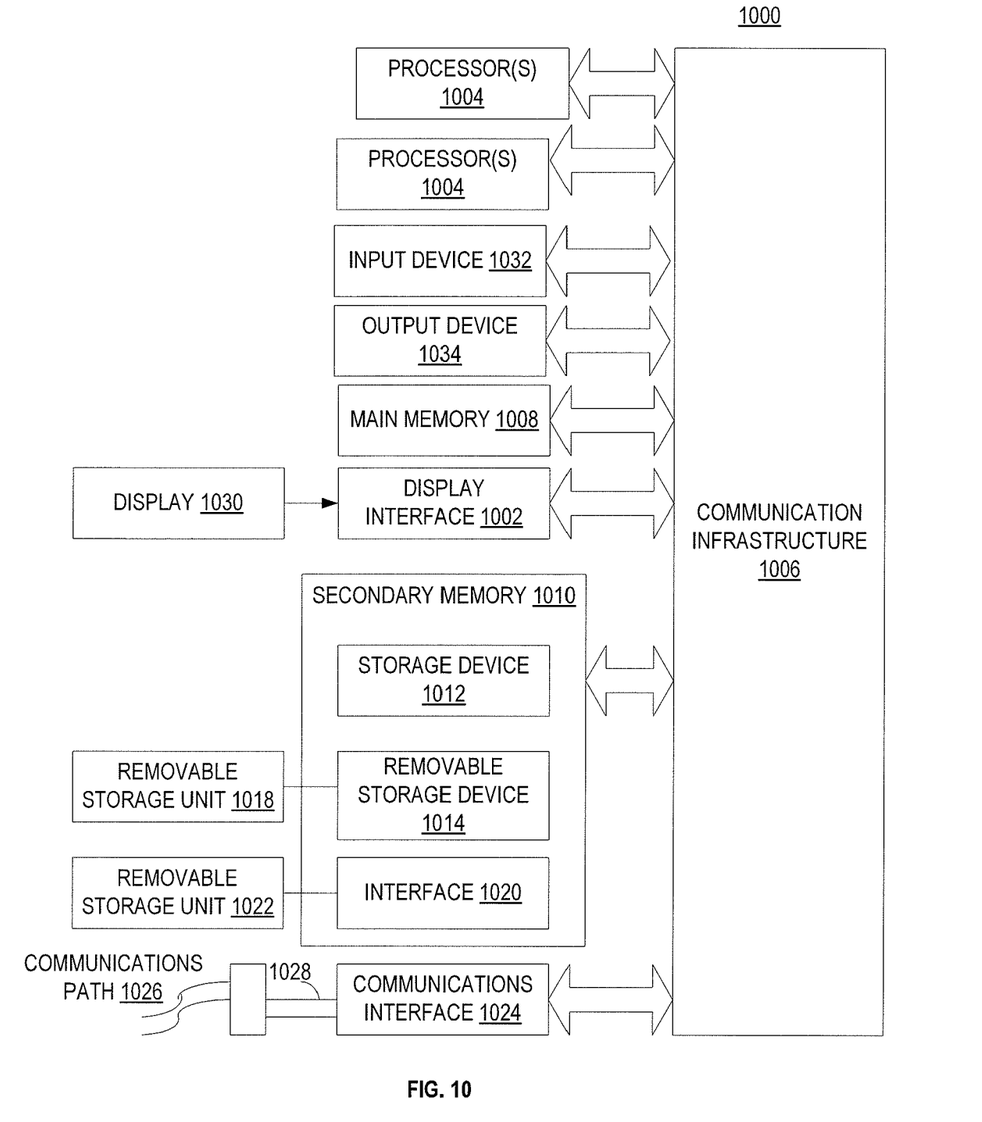
FIG. 10 depicts an exemplary embodiment of a computer system that mat be used in computing devices such as client or server devices according to an exemplary embodiment of the present invention.

FIG. 10 depicts an exemplary embodiment of a computer system that may be used in computing devices such as, e.g., but not limited to, client or server devices according to an exemplary embodiment of the present invention. FIG. 10 depicts an exemplary embodiment of a computer system that may be used as client device 102, or a server device 104, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1000 is shown in FIG. 10, depicting an exemplary embodiment of a block diagram of an exemplary computer system useful for implementing the present invention. Specifically, FIG. 10 illustrates an example computer 1000, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1000 is shown in FIG. 10. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 10.

The computer system 1000 may include one or more processors, such as, e.g., but not limited to, processor(s) 1004. The processor(s) 1004 may be connected to a communication infrastructure 1006 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1000 may include a display interface 1002 that may forward, e.g., but not limited to, graphics, text, and other data, etc., from the communication infrastructure 1006 (or from a frame buffer, etc., not shown) for display on the display unit 1030.

The computer system 1000 may also include, e.g., but may not be limited to, a main memory 1008, random access memory (RAM), and a secondary memory 1010, etc. The secondary memory 1010 may include, for example, (but not limited to) a hard disk drive 1012 and/or a removable storage drive 1014, representing a floppy diskette drive, a magnetic tape drive, an optical disk drive, a compact disk drive CD-ROM, etc. The removable storage drive 1014 may, e.g., but not limited to, read from and/or write to a removable storage unit 1018 in a well known manner. Removable storage unit 1018, also called a program storage device or a computer program product, may represent, e.g., but not limited to, a floppy disk, magnetic tape, optical disk, compact disk, etc. which may be read from and written to by removable storage drive 1014. As will be appreciated, the removable storage unit 1018 may include a computer usable storage medium having stored therein computer software and/or data.

In alternative exemplary embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1022 and interfaces 1020, which may allow software and data to be transferred from the removable storage unit 1022 to computer system 1000.

Computer 1000 may also include an input device such as, e.g., (but not limited to) a mouse or other pointing device such as a digitizer, and a keyboard or other data entry device (none of which are labeled).

Computer 1000 may also include output devices, such as, e.g., (but not limited to) display 1030, and display interface 1002. Computer 1000 may include input/output (I/O) devices such as, e.g., (but not limited to) communications interface 1024, cable 1028 and communications path 1026, etc. These devices may include, e.g., but not limited to, a network interface card, and modems (neither are labeled). Communications interface 1024 may allow software and data to be transferred between computer system 1000 and external devices. Examples of communications interface 1024 may include, e.g., but may not be limited to, a modem, a network interface (such as, e.g., an Ethernet card), a communications port, a Personal Computer Memory Card International Association (PCMCIA) slot and card, etc. Software and data transferred via communications interface 1024 may be in the form of signals 1028 which may be electronic, electromagnetic, optical or other signals capable of being received by communications interface 1024. These signals 1028 may be provided to communications interface 1024 via, e.g., but not limited to, a communications path 1026 (e.g., but not limited to, a channel). This channel 1026 may carry signals 1028, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1014, a hard disk installed in hard disk drive 1012, and signals 1028, etc. These computer program products may provide software to computer system 1000. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the teem "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 1008 and/or the secondary memory 1010 and/or removable storage units 1014, also called computer program products. Such computer programs, when executed, may enable the computer system 1000 to perform the features of the present invention as discussed herein. In particular, the computer programs, when executed, may enable the processor 1004 to provide a method to resolve conflicts during data synchronization according to an exemplary embodiment of the present invention. Accordingly, such computer programs may represent controllers of the computer system 1000.

In another exemplary embodiment, the invention may be directed to a computer program product comprising a computer readable medium having control logic (computer software) stored therein. The control logic, when executed by the processor 1004, may cause the processor 1004 to perform the functions of the invention as described herein. In another exemplary embodiment where the invention may be implemented using software, the software may be stored in a computer program product and loaded into computer system 1000 using, e.g., but not limited to, removable storage drive 1014, hard drive 1012 or communications interface 1024, etc. The control logic (software), when executed by the processor 1004, may cause the processor 1004 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11, such as those referenced above, etc.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer implemented method of balancing load of access points (APs) that are part of a wireless network access system (WNAS), the method comprising:
    associating at least one wireless mobile node (WMN) to a plurality of APs, wherein said at least one WMN and said plurality of APs are part of the WNAS;
    initiating an association of a given WMN with the plurality of APs by inserting the given WMN into the back of a first come first served (FCFS) queue of each of the APs with which the given WMN has successfully been associated with;
    maintaining the associations of the at least one WMN with the plurality of APs;
    servicing the at least one WMN through the FCFS queue on each of the plurality of APs concurrently, by providing service to a given WMN that reaches the front of the FCFS queue of a given AP, as soon as the service is available;
    receiving service at the at least one WMN from the plurality of associated APs within the WMN's communication range simultaneously; and
    placing an associated WMN that reaches the front of a given AP's FCFS queue to the back of the FCFS queue, without providing service, if the associated WMN has no message or packet to transmit.

2. The method according to claim 1, further comprising:
    providing a concurrent multipath transmission control protocol (CMTCP) connection at a transport layer.

3. The method according to claim 1, further comprising:
    operating in a point coordination function (PCF) mode by the plurality of APs.

4. A computer implemented method of balancing load of access points (APs) that are part of a wireless network access system (WNAS), the method comprising:
    associating at least one wireless mobile node (WMN) to a plurality of APs concurrently, wherein said at least one WMN and said plurality of APs are part of the WNAS;
    initiating an association of a given WMN with multiple APs comprising inserting said given WMN into a back of a first come first served (FCFS) queue of each of the APs with which said given WMN has successfully been associated;
    providing service to a WMN that is in the front of a first come first served (FCFS) queue of a given AP, as soon as said service is available;
    not providing any service from a given AP to a given WMN, even when the WMN is in the front of the service queue of the given AP, if the given WMN that is associated with said plurality of APs has no message or packet to transmit;
    placing the given WMN in the back of the FCFS queue; and
    serving the next WMN in the FCFS queue of the AP.

5. A computer implemented method of balancing load of access points (APs) that are part of a wireless network access system (WNAS), the method comprising:
    associating at least one wireless mobile node (WMN) to a plurality of APs concurrently, wherein said at least one WMN and said plurality of APs are part of the WNAS;
    initiating an association of a given WMN with multiple APs comprising inserting said given WMN into a back of a first come first served (FCFS) queue of each of the APs with which said given WMN has successfully been associated;
    providing service to a WMN that is in the front of a first come first served (FCFS) queue of a given AP, as soon as said service is available;
    not providing any service from a given AP to a given WMN that is currently getting service from any other associated AP, even if the WMN moves to the front of the FCFS queue of the given AP; and
    placing the WMN in the back of the FCFS queue of the other associated AP.

6. The method according to claim 1, further comprising:
    removing a given WMN from each and every FCFS queue of corresponding APs with which the given WMN is associated with, when the given WMN is disassociated from the WNAS.

7. The method according to claim 2, wherein said CMTCP comprises:
    a) providing a common transmission queue (TxQ) for internet protocol (IP) packets to be dispatched to all destinations;

b) providing a retransmission queue (RTxQ) for each destination for IP packets dispatched but awaiting acknowledgment;

c) distributing IP packets via a scheduler from the TxQ to destinations for dispatching; and d) removing a given IP packet from the RTxQ upon receiving an acknowledgment of receipt of the given IP packet dispatched from the RTxQ from the recipient.

8. The method according to claim 7, wherein said step of providing a CMTCP connection further comprises:

providing one transmission queue (TxQ) and one retransmission queue (RTxQ) for all destinations/paths.

9. The method according to claim 7, wherein said step of providing a CMTCP connection further comprises:

providing one transmission queue (TxQ) and one retransmission queue (RTxQ) for each destination/path.

10. The method according to claim 7, wherein said step of providing a CMTCP connection further comprises:

providing one transmission queue (TxQ) for all destinations/paths and one retransmission queue (RTxQ) for each destination/path.

11. The method as recited in claim 1 wherein the step of maintaining the associations of the at least one WMN with the plurality of APs, further comprises associating at least one of any newly discovered APs with the at least one WMN.

12. The method as recited in claim 1 wherein the step of maintaining the associations of the at least one WMN with the plurality of APs, further comprises disassociating at least one of any APs that cease to provide services to the at least one WMN.

13. The method as recited in claim 1 further comprising removing a given WMN from a given AP's FCFS queue, when the given WMN is disassociated with the given AP.

14. The method as recited in claim 1 further comprising servicing the at least one WMN through a first come first served (FCFS) queue on each of the plurality of APs, without regard to the current load of any of the APs.

15. The method as recited in claim 1 further comprising the step of allowing a user to select the association of the at least one WMN to at least one of the plurality of APs.

16. A computer implemented method of balancing load of access points (APs) that are part of a wireless network access system (WNAS), the method comprising:

associating at least one wireless mobile node (WMN) to a plurality of APs, wherein said at least one WMN and said plurality of APs are part of the WNAS;

initiating an association of a given WMN with the plurality of APs by inserting the given WMN into the back of a first come first served (FCFS) queue of each of the APs with which the given WMN has successfully been associated with;

maintaining the associations of the at least one WMN with the plurality of APs;

servicing the at least one WMN through the FCFS queue on each of the plurality of APs concurrently, by providing service to a given WMN that reaches the front of the FCFS queue of a given AP, as soon as the service is available;

receiving service at the at least one WMN from the plurality of associated APs within the WMN's communication range simultaneously; and placing an associated WMN that reaches the front of a given AP's FCFS queue to the back of the FCFS queue, without providing service, if the associated WMN is currently receiving service from any other associated AP.

* * * * *